United States Patent
Rofougaran et al.

(10) Patent No.: US 9,002,300 B2
(45) Date of Patent: *Apr. 7, 2015

(54) METHOD AND SYSTEM FOR TIME DIVISION DUPLEXING (TDD) IN A 60 GHZ DISTRIBUTED COMMUNICATION SYSTEM

(75) Inventors: Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 12/895,573

(22) Filed: Sep. 30, 2010

(65) Prior Publication Data

US 2012/0082069 A1    Apr. 5, 2012

(51) Int. Cl.
H04B 7/06        (2006.01)

(52) U.S. Cl.
CPC .................................. H04B 7/0691 (2013.01)

(58) Field of Classification Search
CPC ................. H04B 1/40; H04B 10/1149; H04B 2001/0491; H04B 1/04
USPC .............................................. 455/77, 69, 118
See application file for complete search history.

(56) References Cited

U.S. PATENT DOCUMENTS

| | | | | |
|---|---|---|---|---|
| 5,280,472 A | * | 1/1994 | Gilhousen et al. | 370/335 |
| 5,461,646 A | * | 10/1995 | Anvari | 375/347 |
| 5,519,691 A | * | 5/1996 | Darcie et al. | 370/331 |
| 5,533,011 A | * | 7/1996 | Dean et al. | 370/342 |
| 5,570,353 A | * | 10/1996 | Keskitalo et al. | 370/335 |
| 5,781,847 A | * | 7/1998 | Clarke et al. | 455/69 |
| 5,802,173 A | * | 9/1998 | Hamilton-Piercy et al. | 379/56.2 |
| 5,805,983 A | * | 9/1998 | Naidu et al. | 455/67.16 |
| 5,901,144 A | * | 5/1999 | Maki et al. | 370/330 |
| 5,969,837 A | * | 10/1999 | Farber et al. | 379/56.2 |
| 6,023,458 A | * | 2/2000 | Tweedy et al. | 370/328 |
| 6,070,063 A | * | 5/2000 | Yoshizawa et al. | 455/234.1 |
| 6,078,622 A | * | 6/2000 | Boytim et al. | 375/257 |
| 6,405,018 B1 | * | 6/2002 | Reudink et al. | 455/20 |
| 6,449,477 B1 | * | 9/2002 | Weissman | 455/422.1 |
| 6,493,333 B1 | * | 12/2002 | Kim et al. | 370/342 |
| 6,801,767 B1 | * | 10/2004 | Schwartz et al. | 455/426.2 |

(Continued)

OTHER PUBLICATIONS

Definition of term "Device" located at http://dictionary.reference.com/browse/device.*

(Continued)

Primary Examiner — Gennadiy Tsvey
(74) Attorney, Agent, or Firm — Oblon, McClelland, Maier & Neustadt, L.L.P.

(57) ABSTRACT

Methods and systems for antenna switching for time division duplexing (TDD) in a 60 GHz distributed communication system are disclosed and may include enabling one or more antenna configurations in one or more remote RF modules within a wireless communication device based on a measured signal characteristic. The RF modules may receive IF signals generated from baseband signals via one or more coaxial lines. TDD RF signals may be communicated via the antenna configurations with devices external to the wireless communication device. The IF signals may be tapped in the coaxial lines at taps coupled to the RF modules. The baseband signals may include video, streamed Internet, and/or data from a local data source. The TDD RF signals may be transmitted to a display device. Control signals for the RF devices may be communicated utilizing the coaxial lines.

16 Claims, 5 Drawing Sheets

(56) References Cited

U.S. PATENT DOCUMENTS

| | | | | |
|---|---|---|---|---|
| 7,426,231 | B1* | 9/2008 | Dorfman | 375/130 |
| 7,460,082 | B2* | 12/2008 | Li et al. | 343/893 |
| 7,561,904 | B2* | 7/2009 | Lagnado | 455/575.7 |
| 7,640,035 | B2* | 12/2009 | Jang et al. | 455/551 |
| 7,787,854 | B2* | 8/2010 | Conyers et al. | 455/403 |
| 8,005,050 | B2* | 8/2011 | Scheinert et al. | 370/335 |
| 8,010,116 | B2* | 8/2011 | Scheinert | 455/443 |
| 8,159,399 | B2* | 4/2012 | Dorsey et al. | 343/702 |
| 2001/0046840 | A1* | 11/2001 | Kim | 455/7 |
| 2002/0045460 | A1* | 4/2002 | Makinen et al. | 455/522 |
| 2004/0051598 | A1* | 3/2004 | Vann et al. | 332/103 |
| 2004/0121810 | A1* | 6/2004 | Goransson et al. | 455/562.1 |
| 2006/0253872 | A1* | 11/2006 | Shoji et al. | 725/62 |
| 2007/0149250 | A1* | 6/2007 | Crozzoli et al. | 455/562.1 |
| 2007/0280370 | A1* | 12/2007 | Liu | 375/267 |
| 2007/0281653 | A1* | 12/2007 | Haub | 455/266 |
| 2008/0014948 | A1* | 1/2008 | Scheinert | 455/444 |
| 2008/0058018 | A1* | 3/2008 | Scheinert | 455/562.1 |
| 2009/0061940 | A1* | 3/2009 | Scheinert et al. | 455/562.1 |
| 2009/0258652 | A1* | 10/2009 | Lambert et al. | 455/446 |
| 2009/0316609 | A1* | 12/2009 | Singh | 370/280 |
| 2010/0087227 | A1* | 4/2010 | Francos et al. | 455/562.1 |
| 2011/0063169 | A1* | 3/2011 | Chen et al. | 342/368 |
| 2011/0135013 | A1* | 6/2011 | Wegener | 375/241 |
| 2011/0141895 | A1* | 6/2011 | Zhang | 370/235 |

OTHER PUBLICATIONS

Definition of term "within" located at http://dictionary.reference.com/browse/within.*

* cited by examiner

METHOD AND SYSTEM FOR TIME DIVISION DUPLEXING (TDD) IN A 60 GHZ DISTRIBUTED COMMUNICATION SYSTEM

CROSS-REFERENCE TO RELATED APPLICATIONS/INCORPORATION BY REFERENCE

This application makes reference to:
U.S. patent application Ser. No. 12/895,503 filed on Sep. 30, 2010;
U.S. patent application Ser. No. 12/895,514 filed on Sep. 30, 2010.
U.S. patent application Ser. No. 12/895,520 filed on Sep. 30, 2010;
U.S. patent application Ser. No. 12/895,528 filed on Sep. 30, 2010;
U.S. patent application Ser. No. 12/895,547 filed on Sep. 30, 2010; and
U.S. patent application Ser. No. 12/895,537 filed on Sep. 30, 2010.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for time division duplexing (TDD) in a 60 GHz distributed communication system.

BACKGROUND OF THE INVENTION

In 2001, the Federal Communications Commission (FCC) designated a large contiguous block of 7 GHz bandwidth for communications in the 57 GHz to 64 GHz spectrum. This frequency band may be used by the spectrum users on an unlicensed basis, that is, the spectrum is accessible to anyone, subject to certain basic, technical restrictions such as maximum transmission power and certain coexistence requirements. The communications taking place in this band are often referred to as '60 GHz communications'. With respect to the accessibility of this part of the spectrum, 60 GHz communications may be somewhat similar to other forms of unlicensed spectrum use, for example Wireless LANs or Bluetooth in the 2.4 GHz ISM bands. However, communications at 60 GHz may be significantly different in aspects other than accessibility. For example, 60 GHz signals may possess markedly different communications channel and propagation characteristics, at least due to the fact that 60 GHz radiation is partly absorbed by oxygen in the air, thereby leading to higher attenuation with distance. On the other hand, since a very large bandwidth of 7 GHz is available, very high data rates may be achieved. Among the applications for 60 GHz communications are wireless personal area networks, wireless high-definition television signal, for example from a set top box to a display, or Point-to-Point links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for time division duplexing (TDD) in a 60 GHz distributed communication system n, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
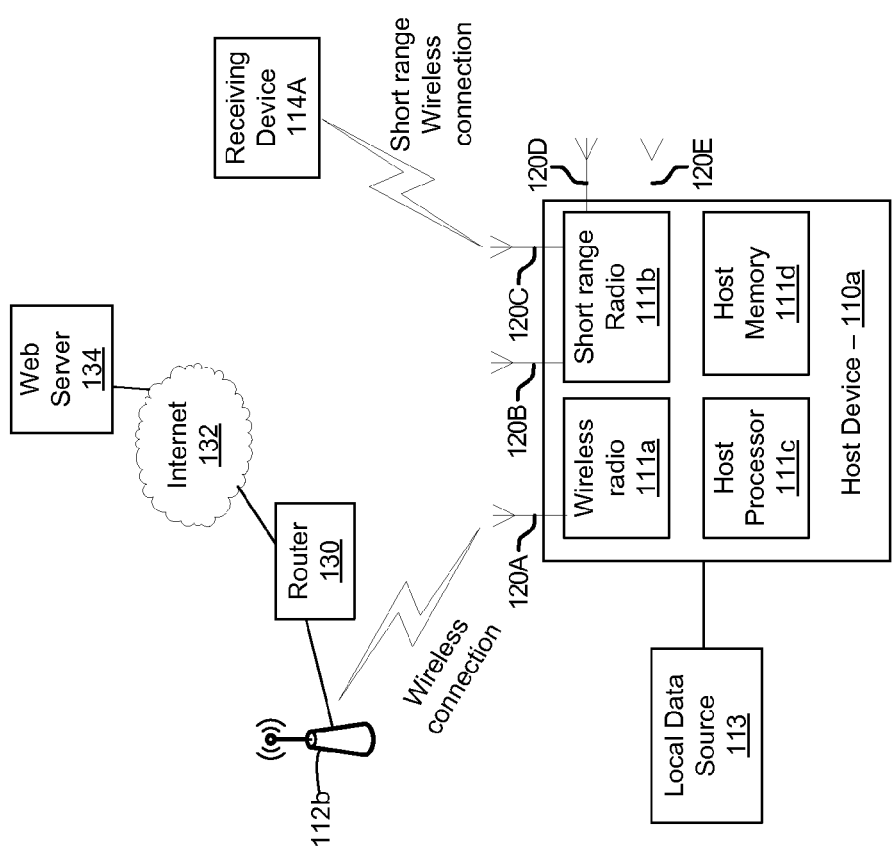
FIG. 1A is a diagram illustrating an exemplary wireless communication system, in accordance with an embodiment of the invention.

Certain aspects of the invention may be found in a method and system for time division duplexing (TDD) in a 60 GHz distributed communication system. Exemplary aspects of the invention may comprise enabling one or more antenna configurations in one or more remote RF modules within a wireless communication device based on a measured signal characteristic. The remote RF modules may receive IF signals generated from baseband signals via one or more coaxial lines. Time division duplexed RF signals may be communicated via the one or more antenna configurations with one or more devices external to the wireless communication device. The IF signals may be tapped in the one or more coaxial lines at taps coupled to the one or more remote RF modules. The baseband signals may comprise video data, Internet streamed data, and/or data from a local data source. The time division duplexed RF signals may be transmitted to a display device. Control signals for the plurality of remote RF devices may be communicated utilizing the one or more coaxial lines. The signal characteristic may comprise a received signal strength indicator, and/or a bit error rate. The output RF signals may comprise 60 GHz signals.

FIG. 1 is a diagram illustrating an exemplary wireless communication system, in accordance with an embodiment of the invention. Referring to FIG. 1, there is shown an access point 112b, a host device 110a, a local data source 113, a receiving device 114a, a router 130, the Internet 132 and a web server 134. The host device 110a, or computer, for example, may comprise a wireless radio 111a, a short-range radio 111b, a host processor 111c, a plurality of antennas 120A-120E, and a host memory 111d. There is also shown a wireless connection between the wireless radio 111a and the access point 112b, and a short-range wireless connection between the short-range radio 111b and the receiving device 114a.

The host device 110a may comprise a computer or set-top box device, for example, that may be operable to receive signals from data sources, process the received data, and communicate the processed data to receiving devices. Accordingly, the host device 110a may comprise processors, such as the host processor 111c, storage devices such as the host memory 111d, and communication devices, such as the wireless radio 111a and the short range radio 111b.

The wireless radio 111a may comprise suitable circuitry, logic, interfaces, and/or code that may be operable to communicate wireless signals to between the host device 110a and external devices, such as the access point 112b, for example. Accordingly, the wireless radio 111a may comprise amplifiers, mixers, analog-to-digital and digital-to-analog converters, phase-locked loops, and clock sources, for example, that enable the communication of wireless signals.

The short-range radio 111b may comprise suitable circuitry, logic, interfaces, and/or code that may be operable to communicate wireless signals over short distances. Accordingly, the frequency of transmission/reception may be in the 60 GHz range, which may enable short-range communications due to the attenuation of signals in air at this frequency. Similarly, the short-range radio 111b may comprise amplifiers, mixers, analog-to-digital and digital-to-analog converters, phase-locked loops, and clock sources, for example, that enable the communication of wireless signals.

The host processor 111c may comprise suitable circuitry, logic, interfaces, and/or code that may be operable to received control and/or data information, which may comprise programmable parameters, to determine an operating mode of the wireless radio 111a and the short-range radio 111b. For example, the host processor 111c may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the host memory 111d via the host processor 111c, for example. The information stored in host memory 111d may be transferred to the wireless radio 111a and/or the short-range radio 111b from the host memory 111d via the host processor 111c.

The host memory 111d may comprise suitable circuitry, logic, interfaces, and/or code that may be enabled to store a plurality of control and/or data information, including parameters needed to calculate frequencies and/or gain, and/or the frequency value and/or gain value. The host memory 111d may store at least a portion of the programmable parameters that may be manipulated by the host processor 111c.

The access point 112b may comprise suitable circuitry, logic, interfaces, and/or code that may be enabled to provide wireless signals to one or more devices within its range. The access point 112b may be coupled to the router 130, thereby enabling connection to the Internet for devices that are operable to communicate with the access point 112b.

The local data source 113 may comprise suitable circuitry, logic, interfaces, and/or code that may be enabled to communicate data to the host device 110a. For example, the local data source may comprise a DVD player, and MP3 player, and/or a set-top box.

The receiving device 114A may comprise suitable circuitry, logic, interfaces, and/or code that may be enabled to receive data communicated by the host device 110a via the short-range radio 111b. In an exemplary embodiment of the invention, the receiving device 114A may comprise an HDTV that may be operable to display HD video signals and playback associated audio signals.

The antennas 120A-120E may comprise suitable circuitry, logic, interfaces, and/or code that may be operable to transmit and/or receive wireless signals. For example, the antenna 120A may be operable to transmit and receive wireless signals between the access point 112b and the wireless radio 111a, and the antennas 120B-120E may be operable to communicate signals between the short range radio 111b and one or more external devices, such as the receiving devices 114A.

The router 130 may comprise suitable circuitry, logic, interfaces, and/or code that may be enabled to communicate signals between the access point 112b and the Internet. In this manner, devices within range of the access point 112b may be enabled to connect to the Internet.

The web server 134 may comprise a remote server that may be operable to store content that may be accessed by the host device 110a via the Internet 132. For example, the web server 134 may comprise a movie provider server and may be operable to communicate a desired movie to the host device 110a via the Internet for display via the receiving device 114A.

Frequently, computing and communication devices may comprise hardware and software to communicate using multiple wireless communication standards. The wireless radio 111a may be compliant with a mobile communications standard, for example. There may be instances when the wireless radio 111a and the short-range radio 111b may be active concurrently. For example, it may be desirable for a user of the computer or host device 110a to access the Internet 132 in order to consume streaming content from the Web server 134. Accordingly, the user may establish a wireless connection between the host device 110a and the access point 112b. Once this connection is established, the streaming content from the Web server 134 may be received via the router 130, the access point 112b, and the wireless connection, and consumed by the computer or host device 110a.

It may be further desirable for the user of the host device 110a to communicate the streaming content to the receiving device 114a, which may comprise a TV or other type of display, for example. Accordingly, the user of the host device 110a may establish a short-range wireless connection with the receiving device 114a. Once the short-range wireless connection is established, and with suitable configurations on the computer enabled, the streaming content may be displayed by the receiving device 114a. In instances where such advanced communication systems are integrated or located within the host device 110a, the radio frequency (RF) generation may support fast-switching to enable support of multiple communication standards and/or advanced wideband systems like, for example, Ultrawideband (UWB) radio. Other applications of short-range communications may be wireless High-Definition TV (W-HDTV), from a set top box to a video display, for example. W-HDTV may require high data rates that may be achieved with large bandwidth communication technologies, for example UWB and/or 60-GHz communications.

In another embodiment of the invention, the local data source 113 may be operable to provide data to be displayed by the receiving device 114a via the host device 110a. For example, the local data source may comprise a DVD player or a digital video recorder. The local data source may communicate with the host device 110a via a wired connection or via a wireless connection, either directly with the host device 110*a* or via the access point 112*b*.

In an embodiment of the invention, the short range radio 111*b* may comprise a plurality of antennas and frequency up-conversion devices throughout the host device 110*a* for communicating high frequency RF signals. The short range radio 111*b* may comprise a baseband and IF stage with a single high power PA that may communicate IF signals over thin coaxial lines. Taps may be configured to couple the IF signals from the coaxial lines to the frequency up-conversion devices before being communicated to the plurality of antennas. In this manner, IF signals may be amplified by a single PA and subsequently up-converted to 60 GHz, for example, for transmission via a plurality of antennas without the need for multiple PAs with excessive power requirements.

By utilizing a plurality of up-conversion transmission/reception devices, each with one or more antennas, time-division multiplexing may be enabled with a plurality of configurations. For example, two or more of the transmission/reception devices may be located in a region of the host device 110*a* where the signal strength may be strongest when communicating with the receiving device 114A. The transmission/reception devices may time division duplex transmission signals with received signals communicated between the host device 110*a* and the receiving device 114A, resulting in an increased signal strength, or reduced bit error rate, for example. Similarly, if a transmission/reception device, or a combination of transmission/reception devices, has the best link to an external device, other transmission/reception devices may communicate via that particular transmission/reception device or devices, utilizing time-division duplexing.

Figure 1B:
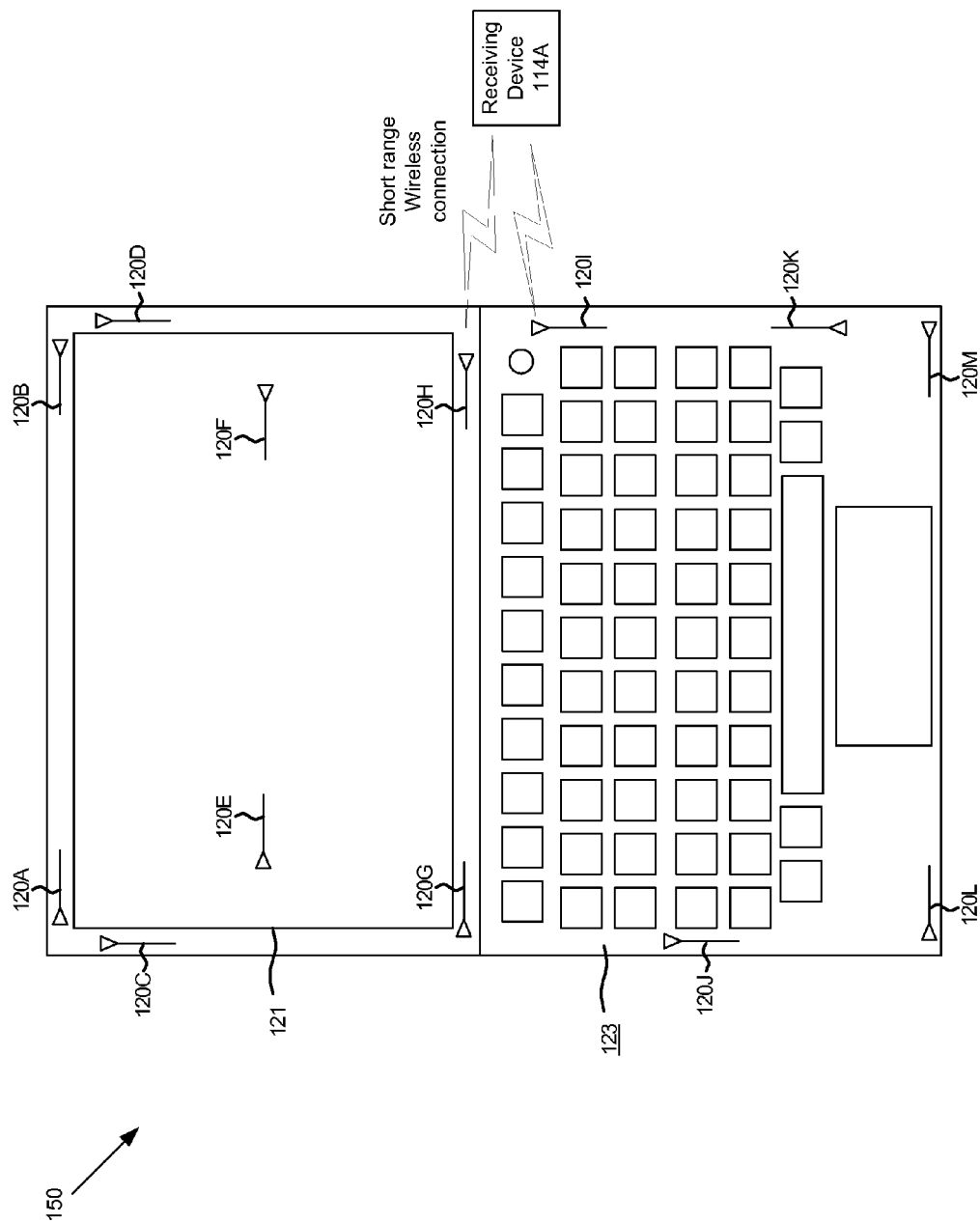
FIG. 1B is a block diagram illustrating a laptop computer with an exemplary 60 GHz distributed communication system, in accordance with an embodiment of the invention.

FIG. 1B is a block diagram illustrating a laptop computer with an exemplary 60 GHz distributed communication system, in accordance with an embodiment of the invention. Referring to FIG. 1B, there is shown a laptop computer comprising a display 121, keyboard 123, and a plurality of antennas 120A-120M.

The antennas 120A-120M may be substantially similar to the antennas 120A-120E described with respect to FIG. 1A, and may comprise antennas coupled to a plurality of remote RF devices throughout the laptop 150. In this manner, one or more antenna configurations may be enabled, depending on the location of the receiving device, such as the receiving device 114A, and the antenna configuration that results in the greatest signal strength, lowest bit error rate, highest data throughput, lowest latency, and/or the optimum of any other desired wireless communication characteristic.

The antennas 120A-120M may be coupled to remote RF devices throughout the laptop 150. The remote RF devices may receive IF signals from a baseband and IF module via thin coaxial lines, described with respect to FIG. 2, and may be operable to up-convert received IF signals to RF signals. In this manner, lower frequency signals may be communicated throughout the laptop 150 to the antennas that result in desired signal quality. This may enable a single high-power PA stage that amplifies the IF signals that are then up-converted to RF in the remote RF modules.

In operation, a short-range wireless communication channel may be enabled between the laptop 150 and the receiving device 114A. A plurality of antenna configurations may be assessed for a desired performance characteristic, such as signal strength, bit error rate, data throughput, and/or latency, for example. The remote RF device configuration with the resulting desired performance may then be enabled to receive IF signals via coaxial lines from a centrally located baseband and IF module, and up-convert the signals to RF before transmitting via the appropriate antennas 120A-120M. In this manner, short-range communications may be enabled to one or more devices independent of its location in proximity with the laptop 150.

Furthermore, a plurality of signals may be time-division multiplexed onto the one or more coaxial lines coupling the IF signals to the remote RF modules that drive the antennas 120A-120M. The enabled RF modules may up-convert the IF signal that is intended to be transmitted from that location. For example, audio and video signals may be multiplexed onto coaxial lines and tapped by the remote RF module or modules coupled to the antennas 120H and 120I, while another signal or signals may be communicated to other antennas of the antennas 120A-120M for transmission. A processor, such as the host processor 111*c* described with respect to FIG. 1A, may control the time-division multiplexing of IF signals onto coaxial lines. In this manner, a plurality of IF signals may be communicated via coaxial lines to a plurality of remote RF devices, which may up-convert the IF signals to different RF frequencies, or subbands, for time-division multiplexed transmission.

Figure 2:
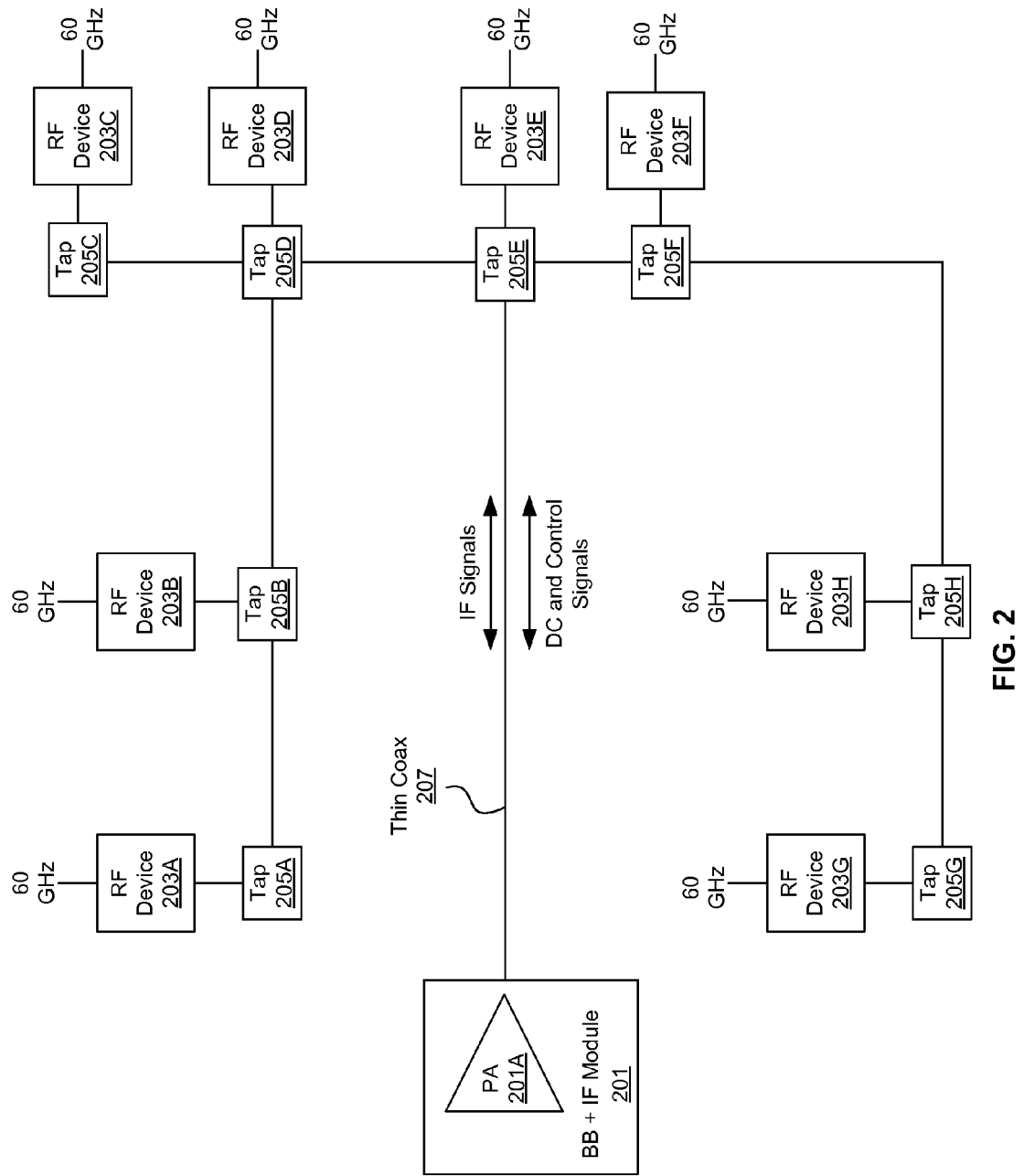
FIG. 2 is a block diagram illustrating an exemplary 60 GHz communication system, in accordance with an embodiment of the invention.

FIG. 2 is a block diagram illustrating a 60 GHz communication system, in accordance with an embodiment of the invention. Referring to FIG. 2, there is shown a baseband and IF module 201, RF devices 203A-203H, taps 205A-205H, and thin coaxial line 207.

The baseband and IF module 201 may comprise suitable circuitry, logic, interfaces, and/or code that may be operable to generate IF signals comprising baseband data. The baseband and IF module 201 may comprise one or more processors, such as a baseband processor, memory, and frequency conversion devices, for example. The processor or processors in the baseband and IF module 201 may be any suitable processor or controller such as a CPU, DSP, ARM, or any type of integrated circuit processor, and may be enabled to update and/or modify programmable parameters and/or values in a plurality of components, devices, and/or processing elements in the baseband and IF module 201. At least a portion of the programmable parameters may be stored in memory, such as the host memory 111*d*, for example, or dedicated memory in the baseband and IF module 201.

The RF devices 203A-203H may comprise suitable circuitry, logic, interfaces, and/or code that may be operable to convert received IF signals to RF frequencies and transmit the RF signals via one or more antennas. The RF devices 203A-203H may be configured remotely throughout a wireless communication device, such as the host device 110*a*, described with respect to FIG. 1, so that 60 GHz signals may be communicated from a plurality of directions, depending on the location of a device that is the intended receiving device. By incorporating frequency up-conversion capability in the RF devices 203A-203H, IF signals may be communicated from a single high power PA in the baseband and IF module 201 via the thin coaxial line 207.

The taps 205A-205H may comprise suitable circuitry, logic, interfaces, and/or code that may be operable to couple a portion of the IF signal being communicated via the thin coaxial line 207 to the associated RF devices 203A-203H. In this manner, taps may be configured to couple signals when it may be desired to transmit RF signals via one or more of the RF devices 203A-203H.

The thin coaxial line 207 may comprise coaxial conductors separated by a dielectric material, for example, and may be operable to communicate IF signals throughout a device, such as the host device 110*a*. In another embodiment of the invention, the thin coaxial line 207 may be operable to provide DC power for various devices within the host device 110a, such as the RF devices 203A-203H.

In operation, the baseband and IF module 201 may process baseband signals for transmission via the RF devices 203A-203H. The baseband signals may be up-converted to IF and amplified by a PA prior to communication via the thin coaxial line 207, which may distribute the IF signals throughout the device, such as the host device 110a, for example. One or more of the taps 205A-205H may be enabled to tap a portion of the communicated IF signals to associated RF devices 203A-203H. The RF devices 203A-203H may up-convert the tapped IF signals to RF frequencies, such as 60 GHz, for example, before transmission via one or more antennas in the RF devices 203A-203H. In this manner, an RF power amplifier is not required at each RF device 203A-203H, which would require more power than by utilizing a single PA at the IF stage in the baseband and IF module 201.

In addition to IF signals to be up-converted and transmitted, the thin coaxial line 207 may communicate low frequency control signals to the RF devices 203A-203H and the taps 205A-205H. The control signals may be utilized to configure which of the taps 205A-205H may be activated to tap off part of the IF signals for transmission by the appropriate RF device 202A-203H. In addition, the control signals may be utilized to configure the up-conversion performed in the RF devices 203A-203H. In this manner, only those RF devices 203A-203H that have antennas in an appropriate direction for a desired receiving device may be activated, further reducing power requirements.

In an exemplary embodiment of the invention, the RF devices 203A-203H may be enabled individually to determine an RSSI for communication between the host device 110a and a remote device, such as the receiving device 114A. One or more antennas in the RF devices 203A-203H may be enabled sequentially, or in any desired order, to determine an antenna configuration that results in the maximum received signal strength, for example. The configuration parameters may be communicated utilizing control channels communicated over the thin coaxial line 207, and the measured signal parameters may be communicated back to the baseband and IF module 201 via the same coaxial line. The control channels may reside at different frequencies than the IF signals to enable multi-signal communication over the thin coaxial line 207.

Time division duplexing may be enabled by configuring one or more antennas in one or more of the RF devices 203A-203H to communicate signals with one or more receiving devices. For example, in instances where one or more of the RF devices 203A-203 has better signal integrity communicating with a receiving device, such as measured by signal strength or bit error rate (BER), that device, or devices, may be utilized to communicate a plurality of signals via time division duplexing. In this manner, a plurality of signals may be multiplexed over an optimum communication configuration, without using excessive power by activating a plurality of power amplifiers and RF upconversion devices.

The optimum configuration may be assessed periodically to determine if one or more other RF devices may be capable of communicating signals with better integrity. The RF devices 205A-205H and associated antennas may be configured by control signals communicated over the thin coaxial line 207. The control signals may be at a different frequency than the IF signals communicated via the RF device 203A-203F.

In an exemplary embodiment of the invention, time division duplexing may be utilized where it may be desirable to communicate a plurality of signals with a receiving device, such as separate audio and video signals to a display device, or by transmitting signals to and receiving signals from the receiving device. In this manner one or more of the RF devices 205A-205H may be enabled to communicate with a receiving device alternating between signal sources or between transmitting and receiving signals.

In another exemplary embodiment of the invention, it may be desirable to communicate to different receiving devices that have highest signal integrity using different RF devices and associated antennas. In this case, the baseband and IF module 201 may multiplex the signals over the thin coaxial line 207, and the appropriate RF device 203A-203H may be enabled to up-convert and transmit the appropriate signal to the receiving device.

Figure 3:
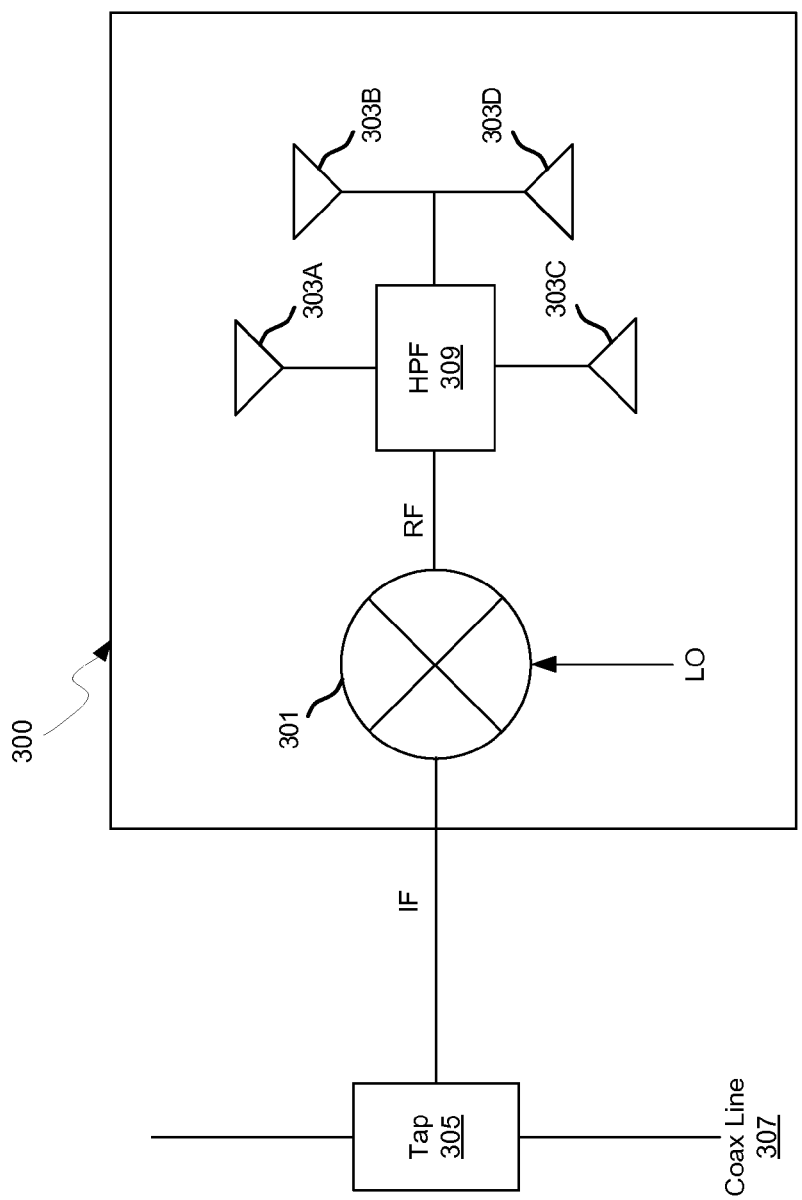
FIG. 3 is a block diagram illustrating an exemplary RF device, in accordance with an embodiment of the invention.

FIG. 3 is a block diagram illustrating an RF device, in accordance with an embodiment of the invention. Referring to FIG. 3, there is shown a tap 305, a coaxial line 307 and an RF device 300 comprising a mixer 301, antennas 303A-303D, and high-pass filter 309. The antennas 303A-303D may comprise antennas operable to transmit and/or receive RF signals, and may be configured with different orientations, for example. The tap 305 and the coaxial line 307 may be substantially similar to the taps 205A-205H and the coaxial line 207 described with respect to FIG. 2.

The mixer 301 may comprise suitable circuitry, logic, interfaces, and/or code that may be operable to frequency shift a received input signal. For example, the mixer 301 may receive an IF input signal and generate an RF output signal. The mixer 301 may also receive as an input signal, an LO signal that may be utilized to up-convert the received IF signal to RF frequencies.

The high-pass filter 309 may comprise suitable circuitry, logic, interfaces, and/or code that may be operable to attenuate low-frequency signals, defined as signals below a configurable corner frequency, and allow frequencies above the corner frequency to pass. For example, if sum and difference signals are generated by the mixer 301 based on the LO signal and received IF signal, the high-pass filter 309 may allow only the high frequency RF signal to pass to the antenna 303.

In operation, control signals in the coaxial line 307 may configure the tap 305 to tap off a portion of an IF signal communicated via the coaxial line 307 and communicate it to the mixer 301. The LO signal may be utilized to up-convert the IF signal to RF frequencies, and the high-pass filter 309 may filter out all but the desired signal at a frequency above a configurable corner frequency of the high-pass filter 309. The control signals may also configure the frequency of the LO signal, thereby configuring the frequency of the RF signal to be communicated.

The filtered RF signal may then be communicated to one or more of the antennas 303A-303D. A desired signal characteristic, such as RSSI or BER, for example, may be utilized to assess the signal received in a plurality of antenna configurations. This may be repeated for each of the antennas 303A-303D as well as for each RF device. In this manner, if one or more of the antennas 303A-303D results in the best signal, that configuration may then be used to communicate RF signal with desired receiving devices.

In an embodiment of the invention, time division duplexing may be enabled by configuring one or more of the antennas 303A-303D in the RF device 300 to communicate signals with one or more receiving devices. For example, in instances where the RF device 300 has better signal integrity communicating with a receiving device than other RF devices, such as measured by signal strength or bit error rate (BER), the RF device 300 may be utilized to communicate a plurality of signals via time division duplexing. In this manner, a plurality of signals may be multiplexed over an optimum communication configuration, without using excessive power by activating a plurality of power amplifiers and RF upconversion devices, many of which may have less-than-optimum signal integrity.

A plurality of time division duplexed signals may be communicated to the RF device 300 via the coaxial line 307 and the tap 305. The mixer 301 may up-convert the received IF signals to RF, such as 60 GHz, for example, and the high-pass filter 309 may remove the low frequency components. The filtered signal may be transmitted via one or more of the antennas 303A-303D. In addition to multiplexing signals to be transmitted, the RF device 300 may also time division duplex the transmission and reception of signals. Accordingly, the RF device 300 may transmit signals for a certain time period, and then receive RF signals during another time period.

Figure 4:
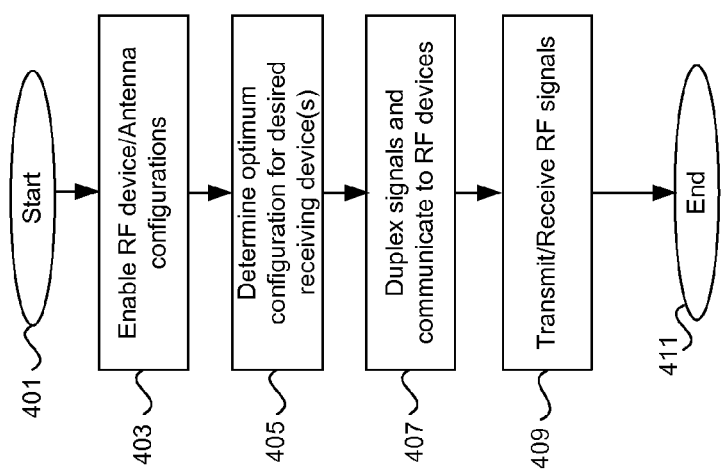
FIG. 4 is a block diagram illustrating exemplary steps in a time division duplexed 60 GHz distributed communication system, in accordance with an embodiment of the invention.

FIG. 4 is a block diagram illustrating exemplary steps in a time division duplexed 60 GHz distributed communication system, in accordance with an embodiment of the invention. Referring to FIG. 4, after start step 401, in step 403, RF devices may be enabled. In step 405, the optimum configuration or configurations may be determined for the desired receiving device or devices. In step 407, baseband signals may be time division duplexed and up-converted to IF before being communicated to the optimum RF device or devices. In step 409, the RF signals may be transmitted by one or more antennas in the RF devices. In another embodiment of the invention, the RF devices may time division duplex transmitted signals and received signals, alternating between transmitting and receiving signals, followed by end step 411.

In an embodiment of the invention, a method and system may comprise enabling one or more antenna configurations in one or more remote RF modules 203A-203H, 300 within a wireless communication device 110a based on a measured signal characteristic. The remote RF modules 203A-203H, 300 may receive IF signals generated from baseband signals via one or more coaxial lines 207, 307. Time division duplexed RF signals may be communicated via the one or more antenna configurations with one or more receiving devices 114A external to the wireless communication device 110a. The IF signals may be tapped in the one or more coaxial lines 207, 307 at taps 205A-205H, 305 coupled to the one or more remote RF modules 203A-203H, 300. The baseband signals may comprise video data, Internet streamed data, and/or data from a local data source. The time division duplexed RF signals may be transmitted to a receiving device 114A. Control signals for the plurality of remote RF devices 203A-203H, 300 may be communicated utilizing the one or more coaxial lines 207, 307. The signal characteristic may comprise a received signal strength indicator, and/or a bit error rate. The output RF signals may comprise 60 GHz signals.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for time division duplexing (TDD) in a 60 GHz distributed communication system.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
   in a wireless communication device comprising a body and a plurality of remote RF modules within said body of said wireless communication device
   amplifying IF signals with a power amplifier in a final amplification stage to create amplified IF signals that are analog signals, the IF signals having been upconverted from baseband signals;
   configuring one or more antennas in said plurality of remote RF modules based on a measured signal characteristic, wherein each of said plurality of remote RF modules receive the amplified IF signals via one or more coaxial lines within said body of said wireless communication device;
   directly upconverting the amplified IF signals to RF;
   communicating low frequency control signals via the one or more coaxial lines for the plurality of remote RF modules; and communicating time division duplexed RF signals, via said one or more antennas, with one or more devices that are external to said wireless communication device based on said configuring.

2. The method according to claim 1, comprising tapping said amplified IF signals in said one or more coaxial lines at taps coupled to said one or more remote RF modules.

3. The method according to claim 1, wherein said baseband signals comprise one or more of video data, streamed Internet data, or data from a local data source.

4. The method according to claim 1, comprising transmitting said time division duplexed RF signals to a display device.

5. The method according to claim 1, wherein said signal characteristic comprises at least one of a bit error rate and a received signal strength indicator.

6. The method according to claim 1, wherein said RF signals comprise 60 GHz signals.

7. The method according to claim 1, wherein the wireless communication device is one of a computer and a set-top box.

8. A system for wireless communication, the system comprising:
   one or more circuits in a body of a computing device with wireless capability, said one or more circuits being operable to
   amplify IF signals with a power amplifier in a final amplification stage to create amplified IF signals that are analog signals, the IF signals being upconverted baseband signals;
   enable one or more antenna configurations in one or more remote RF modules within said body of said computing device based on a measured signal characteristic, wherein said remote RF modules receive the amplified IF signals generated from baseband signals via one or more coaxial lines within said body of said computing device;
   directly upconvert the amplified IF signals to RF;
   communicate low frequency control signals via the one or more coaxial lines for the plurality of remote RF modules; and
   communicate time division duplexed RF signals via said one or more antenna configurations with one or more devices external to said computing device.

9. The system according to claim 8, wherein said one or more circuits are operable to tap said amplified IF signals in said one or more coaxial lines at taps coupled to said one or more remote RF modules.

10. The system according to claim 8, wherein said baseband signals comprise one or more of video data, streamed Internet data, or data from a local data source.

11. The system according to claim 8, wherein said one or more circuits are operable to transmit said time division duplexed RF signals to a display device.

12. The system according to claim 8, wherein said signal characteristic comprises at least one of a bit error rate and a received signal strength indicator.

13. The system according to claim 8, wherein said RF signals comprise 60 GHz signals.

14. The system according to claim 8, wherein the computing device is one of a computer and a set-top box.

15. A system for wireless communication, the system comprising:
   a body embodying
   one or more circuits with wireless capability;
   a processor; and
   a memory having parameters for controlling the one or more circuits;
   a power amplifier configured to amplify IF signals in a final amplification stage to create amplified IF signals that are analog signals, wherein the processor operable to control the one or more circuits using the parameters obtained from the memory to
     enable one or more antenna configurations in one or more remote RF modules within said body of said computing device based on a measured signal characteristic, wherein said remote RF modules receive the amplified IF signals generated from baseband signals via one or more coaxial lines within said body of said computing device;
     directly upconvert the amplified IF signals to RF;
     communicate low frequency control signals via the one or more coaxial lines for the plurality of remote RF modules; and
     communicate time division duplexed RF signals via said one or more antenna configurations with one or more devices external to said computing device.

16. The system according to claim 15, wherein the system is one of a computer and a set-top box.

* * * * *